United States Patent
Angert et al.

(10) Patent No.: US 9,521,215 B1
(45) Date of Patent: Dec. 13, 2016

(54) MICRO CLOUD IMAGE UPLOADING

(71) Applicant: INTERNATIONAL BUSINESS MACHINES CORPORATION, Armonk, NY (US)

(72) Inventors: Aaron D. Angert, Austin, TX (US);
Shawn P. Mullen, Buda, TX (US);
Zachary R. Sais, Austin, TX (US);
Christopher N. Solis, Austin, TX (US);
Elvin D. Tubillara, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/752,174

(22) Filed: Jun. 26, 2015

(51) Int. Cl.
*H04L 9/32* (2006.01)
*H04L 29/08* (2006.01)
*H04L 29/06* (2006.01)

(52) U.S. Cl.
CPC ........... *H04L 67/34* (2013.01); *H04L 63/0428* (2013.01); *H04L 67/02* (2013.01); *H04L 67/1097* (2013.01); *H04L 67/32* (2013.01)

(58) Field of Classification Search
CPC ... H04L 63/08; H04L 63/0807; H04L 63/0815
USPC .......................................................... 713/168
See application file for complete search history.

(56) References Cited

U.S. PATENT DOCUMENTS

| | | | |
|---|---|---|---|
| 8,352,575 B2 | 1/2013 | Samaha | |
| 8,806,520 B2 | 8/2014 | Sharif-Ahmadi et al. | |
| 8,856,852 B2 | 10/2014 | Sharif-Ahmadi et al. | |
| 2013/0125167 A1 | 5/2013 | Sharif-Ahmadi et al. | |
| 2014/0351842 A1 | 11/2014 | Sharif-Ahmadi et al. | |

*Primary Examiner* — Anthony Brown
(74) *Attorney, Agent, or Firm* — Schmeiser, Olsen & Watts; William H. Hartwell

(57) ABSTRACT

A method and system for uploading an image is provided. The method includes registering an application vendor with an account with respect to a computing system. A credentials file and an uploading software application are transmitted to the application vendor and a frozen image of a micro-cloud application running on an origin compute node associated with an application owner is compressed resulting in a compressed micro-cloud application. The credentials file is read and object store access information comprising an object store path and an object store authentication key is retrieved. The compressed frozen image of the micro-cloud application is uploaded and an entitlement package comprising the compressed frozen image of the micro-cloud application and an encrypted version of the object store access information is generated.

20 Claims, 10 Drawing Sheets

MICRO CLOUD IMAGE UPLOADING

FIELD

The present invention relates generally to a method for uploading a micro cloud computing image to a cloud object store and in particular to a method and associated system for creating an entitlement package that is cryptographically bound to the micro cloud computing image within the cloud object store.

BACKGROUND

Accessing cloud based systems may require complex multi-tier environments for eliminating fraud issues. Enabling complex multi-tier environments may include a complicated process that may be time consuming and require a large amount of resources. A typical cloud based system may not include the ability to execute at a multinational level. Accordingly, there exists a need in the art to overcome at least some of the deficiencies and limitations described herein above.

SUMMARY

A first aspect of the invention provides an image uploading method comprising: registering, by one or more computer processors of a computing system, based on a specified business agreement between an application vendor and an administrator of the computing system, the application vendor with an account with respect to the computing system; transmitting, by at least one of the one or more computer processors, to the application vendor in response to the registering, a credentials file and an uploading software application; executing, by at least one of the one or more computer processors, the uploading software application; compressing, by at least one of the one or more computer processors, a frozen image of a micro-cloud application running on an origin compute node associated with an application owner resulting in a compressed micro-cloud application; reading, by at least one of the one or more computer processors, the credentials file; retrieving, by at least one of the one or more computer processors, based on results of the reading, object store access information comprising an object store path and an object store authentication key; uploading by at least one of the one or more computer processors, the compressed frozen image of the micro-cloud application in response to the retrieving the object store access information; and generating, by at least one of the one or more computer processors executing the uploading software application, an entitlement package comprising the compressed frozen image of the micro-cloud application and an encrypted version of the object store access information.

A second aspect of the invention provides a computing system comprising one or more computer processors coupled to a computer-readable memory unit, the memory unit comprising instructions that when executed by at least one of the one or more computer processors implements an image uploading method comprising: registering, by at least one of the one or more computer processors, based on a specified business agreement between an application vendor and an administrator of the computing system, the application vendor with an account with respect to the computing system; transmitting, by at least one of the one or more computer processors, to the application vendor in response to the registering, a credentials file and an uploading software application; executing, by at least one of the one or more computer processors, the uploading software application; compressing, by at least one of the one or more computer processors, a frozen image of a micro-cloud application running on an origin compute node associated with an application owner resulting in a compressed micro-cloud application; reading, by at least one of the one or more computer processors, the credentials file; retrieving, by at least one of the one or more computer processors, based on results of the reading, object store access information comprising an object store path and an object store authentication key; uploading by at least one of the one or more computer processors, the compressed frozen image of the micro-cloud application in response to the retrieving the object store access information; and generating, by at least one of the one or more computer processors executing the uploading software application, an entitlement package comprising the compressed frozen image of the micro-cloud application and an encrypted version of the object store access information.

A third aspect of the invention provides a computer program product, comprising a computer readable hardware storage device storing a computer readable program code, the computer readable program code comprising an algorithm that when executed by one or more computer processors of a computing system implements an image uploading method, the method comprising: registering, by at least one of the one or more computer processors, based on a specified business agreement between an application vendor and an administrator of the computing system, the application vendor with an account with respect to the computing system; transmitting, by at least one of the one or more computer processors, to the application vendor in response to the registering, a credentials file and an uploading software application; executing, by at least one of the one or more computer processors, the uploading software application; compressing, by at least one of the one or more computer processors, a frozen image of a micro-cloud application running on an origin compute node associated with an application owner resulting in a compressed micro-cloud application; reading, by at least one of the one or more computer processors, the credentials file; retrieving, by at least one of the one or more computer processors, based on results of the reading, object store access information comprising an object store path and an object store authentication key; uploading by at least one of the one or more computer processors, the compressed frozen image of the micro-cloud application in response to the retrieving the object store access information; and generating, by at least one of the one or more computer processors executing the uploading software application, an entitlement package comprising the compressed frozen image of the micro-cloud application and an encrypted version of the object store access information.

The present invention advantageously provides a simple method and associated system capable of accessing cloud based systems.

DETAILED DESCRIPTION

Figure 1:
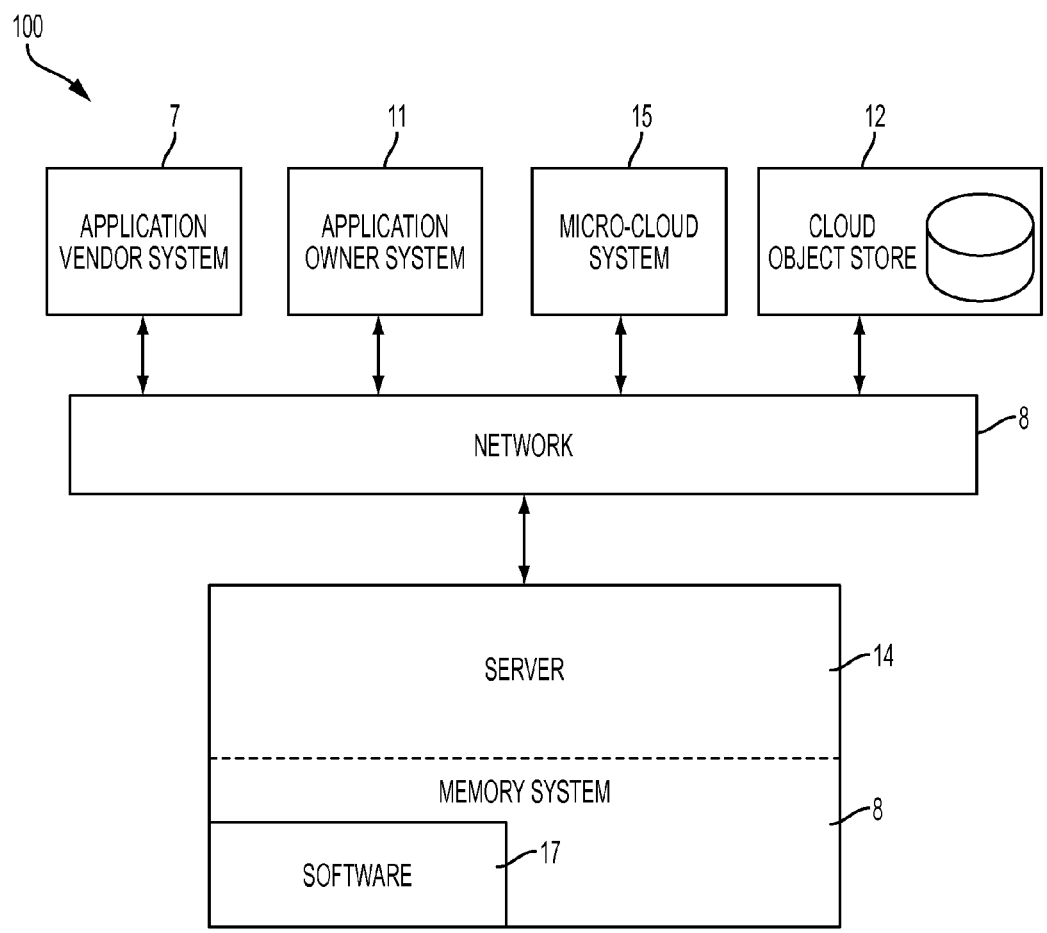
FIG. 1 illustrates a system or enabling a process for creating an entitlement package that is cryptographically bound to a micro cloud computing image within a cloud object store, in accordance with embodiments of the present invention.

FIG. 1 illustrates a system 100 for enabling a process for creating an entitlement package that is cryptographically bound to a micro-cloud system 15 computing image within a cloud object store 12, in accordance with embodiments of the present invention. In order to initiate the process, the micro-cloud system 15 computing image is uploaded to cloud object store 12 prior to creating the entitlement package. Additionally, a retriever package comprising a cloud computing image agent and a location of the cloud computing image within cloud object store 12 is generated. The retriever package is transferred to a pre-determined cloud computing provider.

System 100 of FIG. 1 includes an application vendor system 7, an application owner system 11, a micro-cloud system 15, and a cloud object store 12 connected through a network 8 to a server 14. Network 8 may include any type of network including, inter alia, a local area network, (LAN), a wide area network (WAN), the Internet, a wireless network, etc. Application vendor system 7, application owner system 11, micro-cloud system 15, Cloud object store 12, and server 14 may include any type of hardware device and/or software systems including, inter alia, a computer (PC), a laptop computer, a tablet computer, a server, a PDA, a smart phone, a database system, an embedded controller, etc. An embedded controller is defined herein as a computer comprising a dedicated functionality that enables various system tasks that an operating system does not handle. An embedded controller may include specific internal dedicated hardware such as a microcontroller (a CPU comprising integrated memory and peripherals). Additionally, an embedded controller may include its own RAM and flash ROM for its own internal dedicated software. Server 14 includes a memory system 8. Memory system 8 may include a single memory system. Alternatively, memory system 8 may include a plurality of memory systems. Memory system 8 may include a database and software 17. A database may include a database table. Software 17 enables system 100 to perform a process for transforming an application runtime environment into a micro-cloud image for upstream processing. An upstream processing command will upload the micro-cloud image into a cloud based on an account key belonging to an application vendor (via application vendor system). The application vendor is unable to communicate with a back end cloud (i.e., a micro-cloud system). The account key may comprise an application programming interface (API) key.

Figure 2:
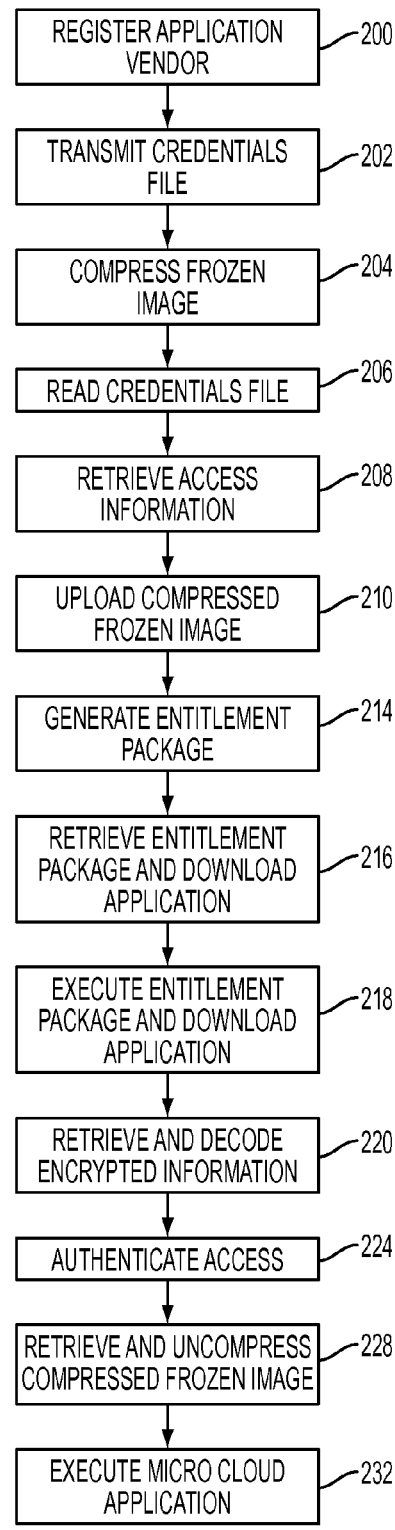
FIG. 2 illustrates an algorithm detailing a process flow enabled by the system of FIG. 1 for enabling a process for creating an entitlement package that is cryptographically bound to the micro cloud computing image within the cloud object store, in accordance with embodiments of the present invention.

FIG. 2 illustrates an algorithm detailing a process flow enabled by system 100 of FIG. 1 for enabling a process for creating an entitlement package that is cryptographically bound to the micro cloud computing image within the cloud object store, in accordance with embodiments of the present invention. Each of the steps in the algorithm of FIG. 2 may be enabled and executed in any order by a computer processor executing computer code. In step 200, an application vendor is registered with an account with respect to a computing system. The registration is based on a specified business agreement between an application vendor and an administrator of the computing system. In step 202, a credentials file and an uploading software application are transmitted to the application vendor in response to the registration of step 200. In step 204, a frozen image of a micro-cloud application running on an origin compute node associated with an application owner is compressed (resulting in a compressed micro-cloud application) via execution of the uploading software application. In step 206, the credentials file is read. In step 208, object store access information comprising an object store path and an object store authentication key is retrieved based on results of step 206. In step 210, the compressed frozen image of the micro-cloud application is uploaded via retrieving the object store access information. In step 214, an entitlement package comprising the compressed frozen image of the micro-cloud application and an encrypted version of the object store access information is generated. In step 216, the entitlement package and a downloading software application are retrieved via a target compute node in response to a request from a user. In step 218, the entitlement package and the downloading software application are executed via the target compute node. In step 220, the encrypted version of the object store access information is retrieved retrieving via the target compute node and decoded resulting in the object store access information being decrypted. In step 224, object store access is authenticated based on results of the decoding of step 220. In step 228, the compressed frozen image of the micro-cloud application is retrieved and uncompressed. Retrieving the compressed frozen image of the micro-cloud application may include:
1. Generating a read only one time use URL.
2. Transmitting the read only one time use URL to a download command application.
3. Signaling initiation of downloading the compressed frozen image.
4. Deleting the read only one time use URL.

In step 232, the micro-cloud application is executed via the target compute node.

FIGS. 3A-3D, in combination, illustrate an implementation example comprising a system for enabling a process for creating an entitlement package that is cryptographically bound to a micro cloud computing image within a cloud object store, in accordance with embodiments of the present invention. The system illustrated in FIGS. 3A-3B comprises a build portion 301a, an entitlement package 301b, a transform portion 301c, and a deploy portion 301d.

Figure 3A:
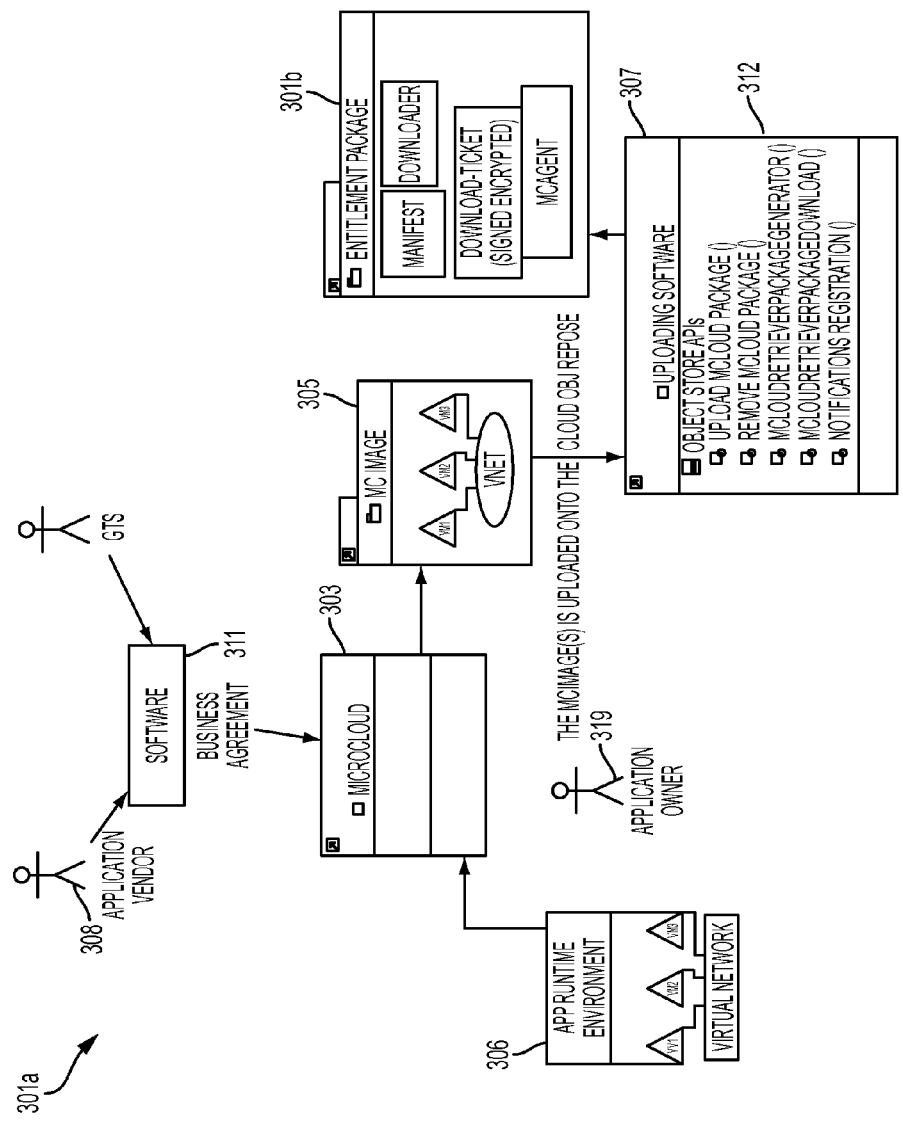
FIGS. 3A-3D, in combination, illustrate an implementation example comprising a system for enabling a process for creating an entitlement package that is cryptographically bound to a micro cloud computing image within a cloud object store, in accordance with embodiments of the present invention.

FIG. 3A illustrates build portion 301a executing a process for transforming an application runtime environment 306 into a micro-cloud image 305 followed by uploading software 307 processing. An upload command uploads the micro-cloud image 305 into a cloud based on an account key of an application vendor 308 with respect to a software application 311. Application vendor 308 has no exposure a micro-cloud 303. The account key comprises an application programming interface (API) key. In order to initiate the transformation process executed by build portion 301a, application vendor 308 registers into software application and receives an associated account and key. Likewise, an application owner 319 executes the micro-cloud 303 and captures a runtime environment into the micro-cloud image 305. Additionally, application owner 319 commands the uploading software 307 to upload the micro-cloud image 305 to a cloud object store 312 and an entitlement package 301b cryptographically binding the micro-cloud image 305 within cloud object store 312 is generated. In response, application owner 319 generates a retriever package comprising a micro-cloud agent and a location within object store 312 for micro-cloud image 305. The retriever package is automatically uploaded to a marketplace.

Figure 3B:
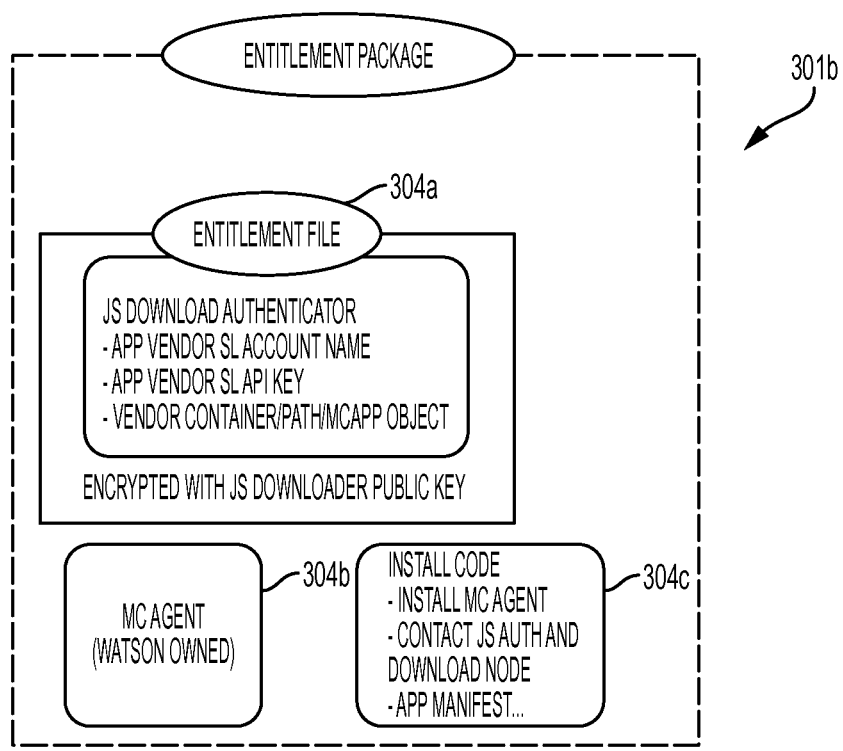

FIG. 3B illustrates an expanded view of entitlement package 301b. Entitlement package 301b comprises an entitlement file 304a, a micro-cloud agent 304b, and install code 304c. The entitlement file 304a is programmatically generated during a process for generating micro-cloud 303 (of application vendor 308) and uploading the micro-cloud 303 into a cloud object store as described with respect to FIG. 4A, infra. Entitlement file 304a allows a customer to access micro-cloud 303. Additionally, entitlement file 304a protects the application vendor's cloud object store related account from any further access by the customer. Entitlement file 304a comprises a Java Script (JS) downloader authenticator encrypted with a JS downloader public key. The encryption protects the customer from viewing the application vendor's sensitive object store account information while allowing the customer to access an entitled micro-cloud 303 within an associated account. The JS downloader authenticator (i.e., within entitlement file 304a) comprises an app vendor SL account name and app vendor SL API key used to authenticate and access the application vendor's object store. The JS downloader authenticator additionally comprises a vendor containerpatmcapp object that includes a path and object name of the customer access entitled micro-cloud. The Install Code 304c is executed by the customer. It installs MC Agent 304B on the customer server 326. The Install Code 304c comprises a contact JS auth and download node component that includes a universal record locator (URL) of the JS auth and download node. The Install Code 304 uses the URL to locate and connect to the JS auth and download node. The install Code 304 internally comprises an app manifest that includes a manifest of necessary virtual machines and virtual networks required to host the micro-cloud. The MC Agent 304b uses the manifest to provision the virtual machines and virtual networks hosting the micro-cloud.

Figure 3C:
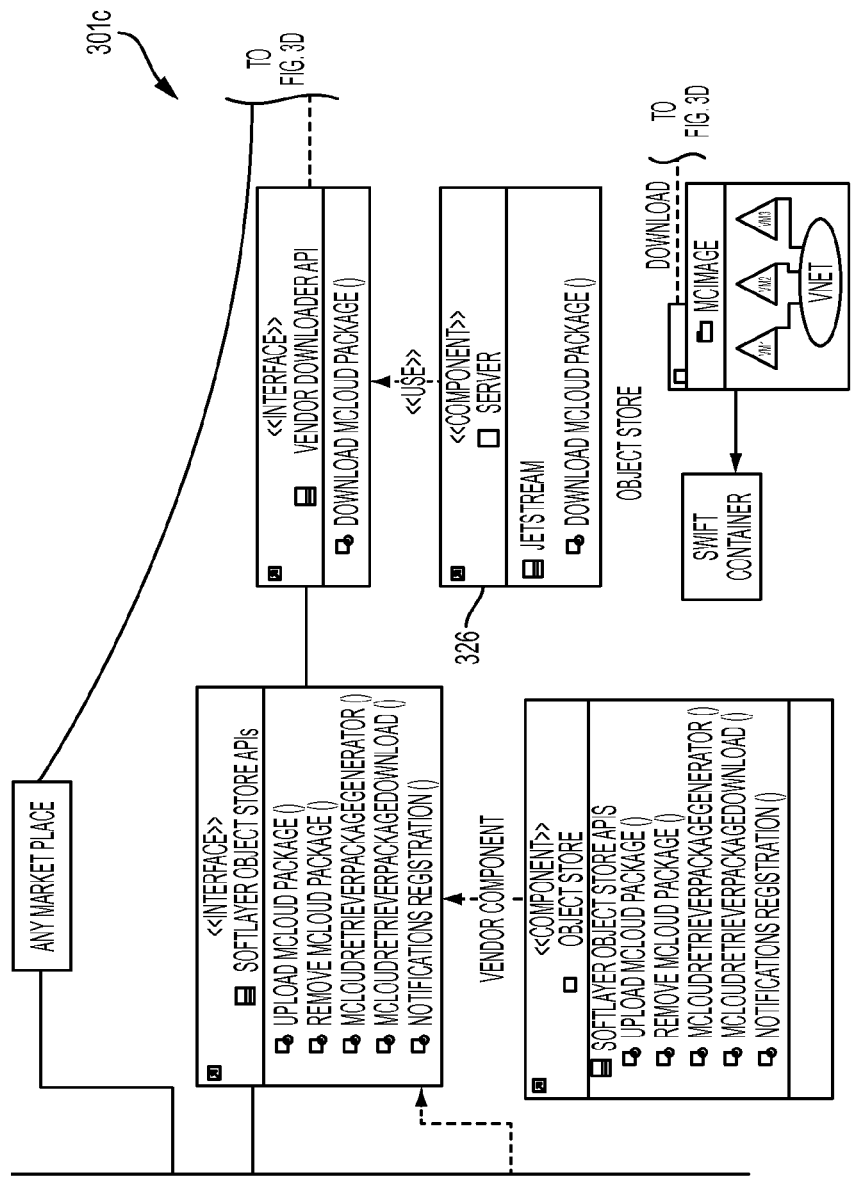

FIG. 3C illustrates transform portion 301c executing a process for enabling a vendor to sell entitlement package 301b on any cloud marketplace. A server 326 comprises a stored private key associated with a matching public key encrypted within entitlement package 301b. Upon purchase of entitlement package 301c, an end user runs a download command to automatically retrieve micro-cloud image 305 and execute application runtime environment 306.

Figure 3D:
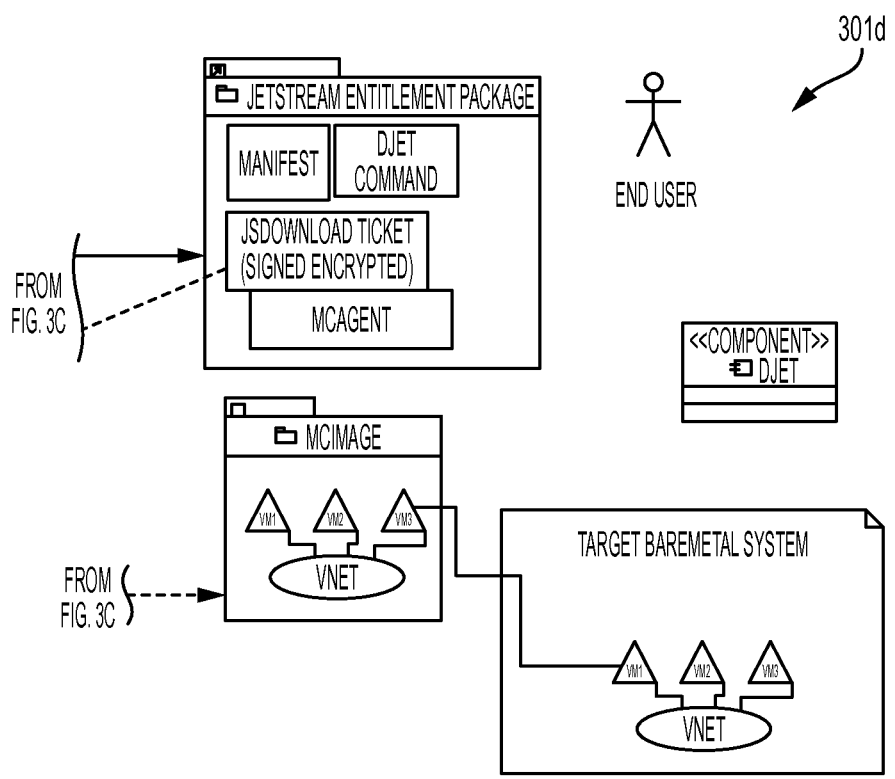

FIG. 3D illustrates deploy portion 301d executing a deployment process. During a deploy stage, an end user purchasing entitlement package 301b executes a download command establishing a SSL connection to server 326 (of FIG. 3C). The download command in combination with the SSL connects to server 326 and transmits entitlement package 301b to the server 326. In response, server 326 decrypts entitlement package 301b. The aforementioned process comprises decrypting with entitlement package 301b with a private key of server 326 and extracting an object store access API-key of the application vendor. The decryption process comprises:

1. Decrypting entitlement package 301b with a private key of server 326 such that an application remains unknown.
2. Allowing (via a decrypted vendor API) server 326 to verify entitlement rights to an application within an object store of a vendor.
3. Verifying (via a decrypted path to the vendor's micro-cloud image) the end user's entitlement to the application and micro-cloud image.

Deploy portion 301d executing a deployment process that includes:

1. Generating a one-time use randomly named public read-only secure URL connected to micro-cloud image 305. The URL may include a specified time limit for use.
2. Transmitting the URL to the download command. The download command connects to the URL and initiates a download. Additionally, the download command and end user system are unable to access any other files in the object store except an entitled micro-cloud image.
3. During the download process, the download command notifies server 326 that the download has initiated.
4. Removing (by server 326) the public URL without affecting the currently running download process.

Build portion 301a, entitlement package 301b, transform portion 301c, and deploy portion 301d, in combination, enable movement of a large data object(s) while simultaneously and cryptographically capturing authentication credentials of a cloud object store. The captured authentication credentials are cryptographically sealed such that exposure of the authentication credentials is protected. Additionally, the captured authentication credentials are embedded into an entitlement file packaged into an entitlement package for publically available sale. An associated purchased retriever file is enabled such that it will not expose the authentication credentials as they are cryptographically sealed. Upon purchase and execution, the retriever program authenticates to a server cryptographically verifying the authentication credentials on a cloud server without exposing the authentication credential to a purchaser. Additionally, the cloud server opens a unique, secure, onetime SSL connection directly to the cloud object store and removes the server from the download network flow. Upon initiation of the download, a unique one time ephemeral URL is removed without disruption to the currently running download process. A cryptographic one to one binding between the retriever file and the large data object(s) prevent the retriever from accessing any other objects in the cloud object store. The unique and secure onetime connection comprises a direct connection between the system running the retriever program and the cloud object store. The direct connection comprising a download only connection and does not allow the retriever to write or alter any objects in the cloud object store.

Figure 4A:
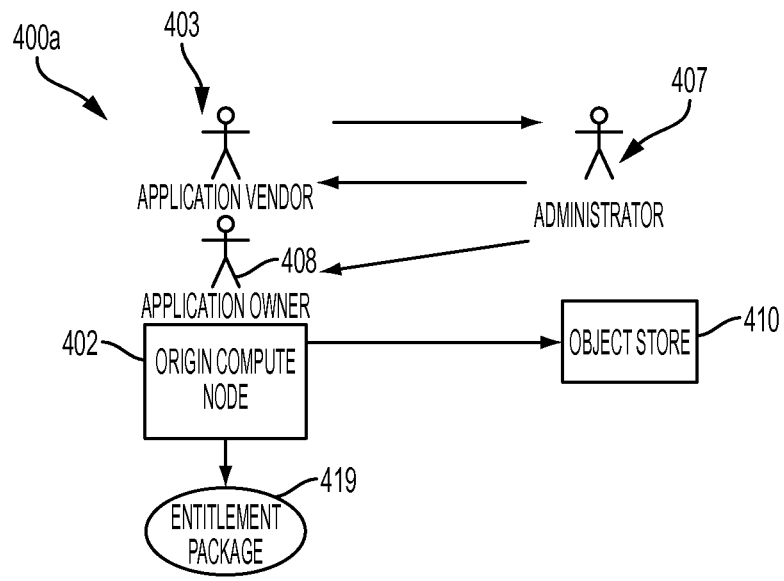
FIG. 4A illustrates a process for generating an entitlement package, in accordance with embodiments of the present invention.

FIG. 4A illustrates a process 400a for generating an entitlement package 419, in accordance with embodiments of the present invention. Process 400a is initiated when an application vendor 403 and an administrator 407 reach a business agreement. In response, administrator 407 registers application vendor 403 with an account and allocates a download program and a credentials file to application vendor 403. The credentials file comprises access information to an object store including a path and API key tied to application vendor 403. The credentials file additionally comprises public key to a server for encryption. Additionally, an application owner 408 comprises a micro-cloud application running on an origin compute node 402. The micro-cloud application freezes the application for an upload program. The upload program compresses the micro-cloud application and reads the contents of the credentials file. Additionally, the upload program retrieves object store access information including an object store path and object store authentication key. The micro-cloud application is uploaded to an object store 410 via the access information and the upload program generates entitlement package 419 for sale via a third party application. An object store is defined herein as a collection of machines for storing data abstracted as objects. Access to an object store may be authenticated via an API key. A data object may be placed or retrieved via an API key and a specified path. An object store is enabled to create a temporary secure URL. The entitlement package 419 comprises encrypted object store access information for decoding by a single server only.

Figure 4B:
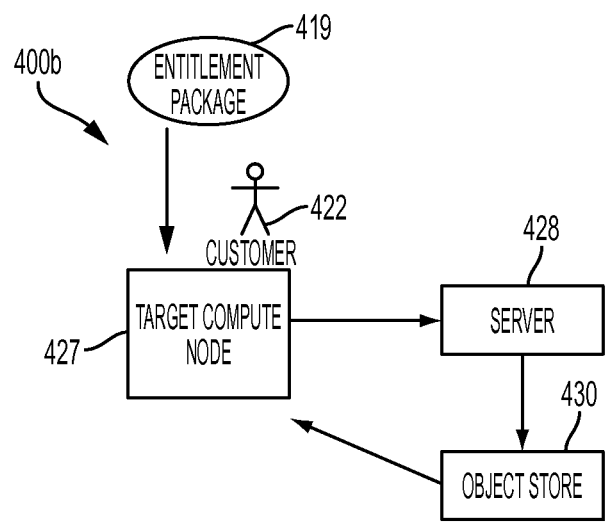
FIG. 4B illustrates a process for executing an entitlement package, in accordance with embodiments of the present invention.

FIG. 4B illustrates a process 400b for executing entitlement package 419, in accordance with embodiments of the present invention. Process 400b is initiated when a customer 422 purchases or retrieves the entitlement package 419 including the download program. The entitlement package 419 placed on a target compute node 427 for execution on a cloud application. The customer 422 executes the entitlement package 419 and runs the download program. The download program transmits encrypted object store access information to a server 428. In response, server 428 decodes the encrypted object store access information and authenticates access to an object store 430. The target compute node 427 is enabled to retrieve the micro-cloud application from object store 430. A download process is initiated by the download program and upon completion of the download process, the micro-cloud application is uncompressed and is rehydrated for execution on compute node 402.

Figure 4C:
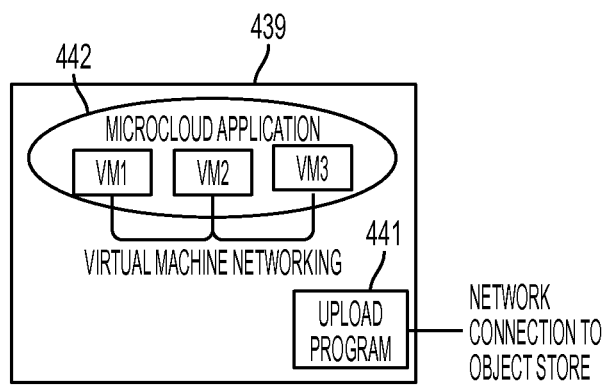
FIG. 4C illustrates an expanded view of an origin compute node, in accordance with embodiments of the present invention.

FIG. 4C illustrates an expanded view of an origin compute node 439, in accordance with embodiments of the present invention. Origin compute node 439 comprises a micro-cloud application 442 (comprising virtual machines) and an upload program 441. Origin compute node 439 comprises a bare metal machine that includes resources for running a set of virtual machines owned by an application owner. The virtual machines and associated resources may be captured to create micro-cloud application 442. Upload program 441 comprises an executable file for reading a credentials file, retrieving object store access information, compressing and uploading micro-cloud application 442 to an object store, and generating an entitlement package.

Figure 4D:
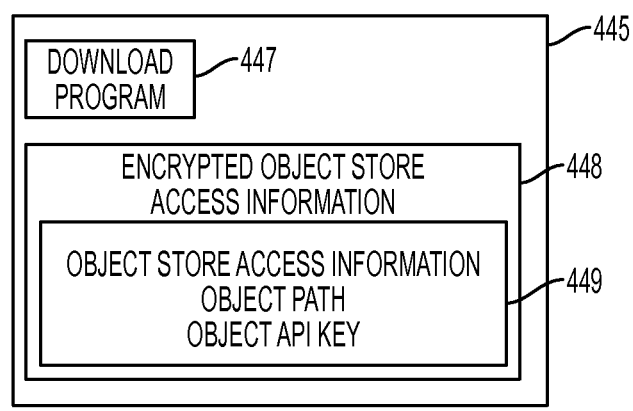
FIG. 4D illustrates an expanded view of an entitlement package, in accordance with embodiments of the present invention.

FIG. 4D illustrates an expanded view of an entitlement package 445, in accordance with embodiments of the present invention. Entitlement package 445 comprises a zipped directory that includes a download program 447, encrypted object store access information 448, and object store access information 449 for object store access. Download program 447 comprises an executable program packaged with entitlement package 445. Download program 447 transmits the encrypted object store access information 448 to a server and if authenticated, the server replies with a temporary URL for connection.

Figure 4E:
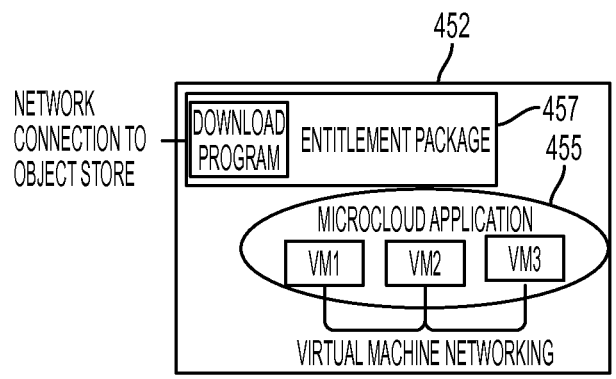
FIG. 4E illustrates an expanded view of a target compute node, in accordance with embodiments of the present invention.

FIG. 4E illustrates an expanded view of a target compute node 452, in accordance with embodiments of the present invention. Target compute node 452 comprises a bare metal machine including resources to run micro-cloud application 455 comprising a set of virtual machines. A customer accessing target compute node may purchase an entitlement package 457. Micro-cloud application 455 comprises an application that captures VM run time environments. Capturing VM run time environments may include capturing virtual image files and network connectivity.

Figure 4F:
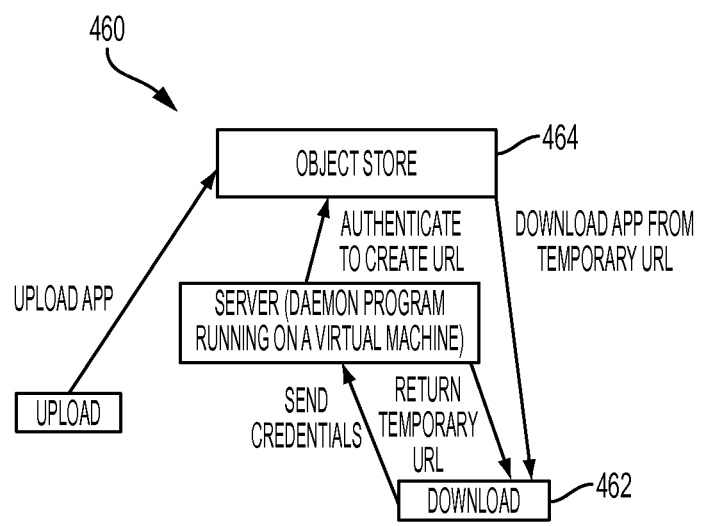
FIG. 4F illustrates an expanded view of a server, in accordance with embodiments of the present invention.

FIG. 4F illustrates an expanded view of a server 460, in accordance with embodiments of the present invention. Server 460 includes a daemon program that executes on a virtual server associated with a task of waiting for requests from a download command 462 from a remote server for downloading a cloud application. Server 460: receives encrypted object store 464 access information from download command 462, decrypts the access information, authenticates into object store 464, and retrieves a short temporary URL. The URL is transmitted back to the remote server that running the download command 462.

Figure 5:
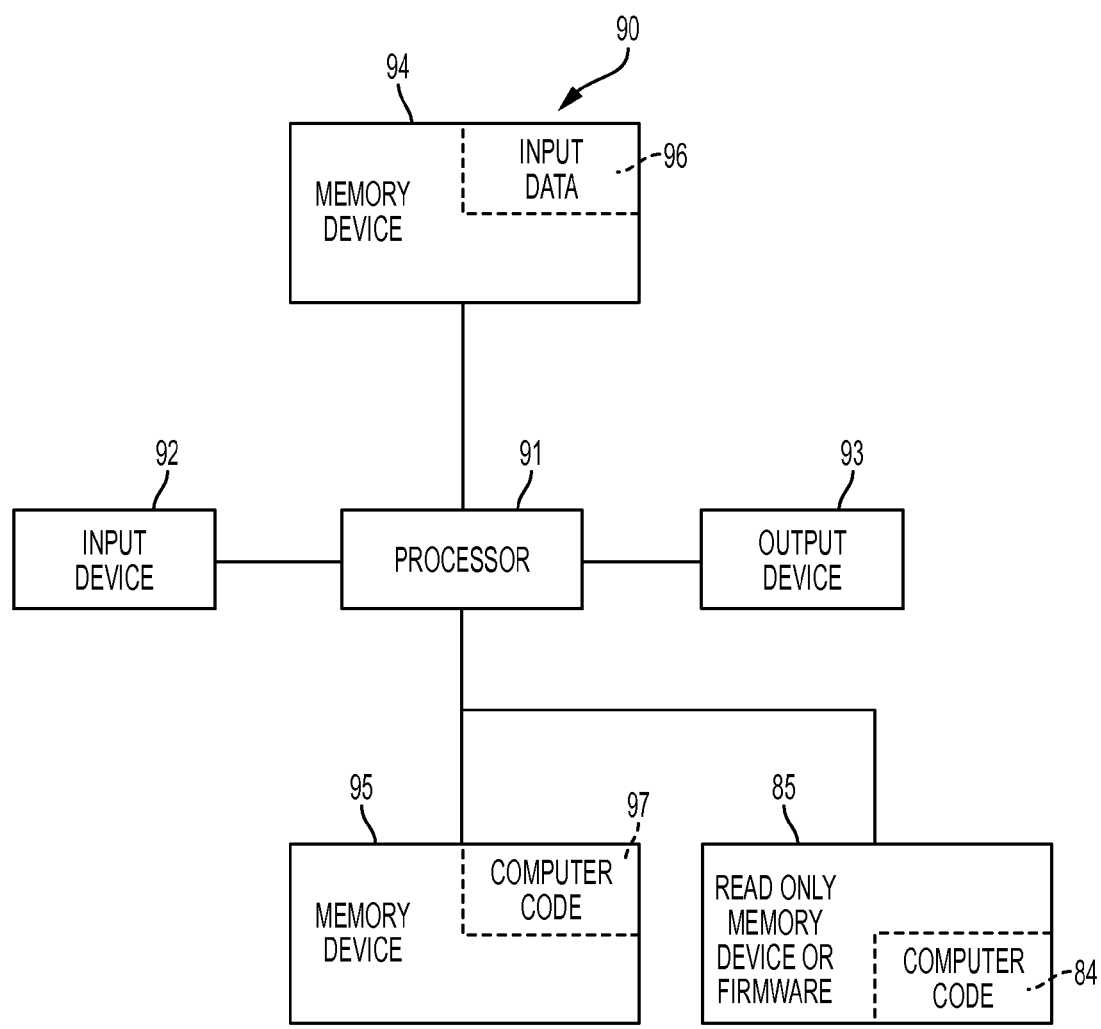
FIG. 5 illustrates a computer system for enabling a process for creating an entitlement package that is cryptographically bound to a micro cloud computing image within a cloud object store, in accordance with embodiments of the present invention.

FIG. 5 illustrates a computer system 90 (e.g., server 14 of FIG. 1) for enabling a process for creating an entitlement package that is cryptographically bound to a micro cloud computing image within a cloud object store, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4B) for enabling a process for creating an entitlement package that is cryptographically bound to a micro cloud computing image within a cloud object store. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 85) may include the algorithms of FIGS. 2-4B and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-4B) may be stored on a static, nonremovable, read-only storage medium such as a Read-Only Memory (ROM) device 85, or may be accessed by processor 91 directly from such a static, nonremovable, read-only memory device 85. Similarly, in some embodiments, stored computer program code 84 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for creating an entitlement package that is cryptographically bound to a micro cloud computing image within a cloud object store. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for creating an entitlement package that is cryptographically bound to a micro cloud computing image within a cloud object store. In another embodiment, the invention provides a business method that performs the process steps of the invention on a subscription, advertising, and/or fee basis. That is, a service supplier, such as a Solution Integrator, could offer to allow users to enable a process for creating an entitlement package that is cryptographically bound to a micro cloud computing image within a cloud object store. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An image uploading method comprising:
    registering, by one or more computer processors of a computing system, based on a specified business agreement between an application vendor and an administrator of said computing system, said application vendor with an account with respect to said computing system;
    transmitting, by at least one of the one or more computer processors, to said application vendor in response to said registering, a credentials file and an uploading software application;
    executing, by at least one of the one or more computer processors, said uploading software application;
    compressing, by at least one of the one or more computer processors, a frozen image of a micro-cloud application running on an origin compute node associated with an application owner resulting in a compressed micro-cloud application;
    reading, by at least one of the one or more computer processors, said credentials file;
    retrieving, by at least one of the one or more computer processors, based on results of said reading, object store access information comprising an object store path and an object store authentication key;
    uploading by at least one of the one or more computer processors, said compressed frozen image of said micro-cloud application in response to said retrieving said object store access information; and
    generating, by at least one of the one or more computer processors executing said uploading software application, an entitlement package comprising said compressed frozen image of said micro-cloud application and an encrypted version of said object store access information.

2. The method of claim 1, further comprising:
    retrieving from a target compute node, by at least one of the one or more computer processors, in response to a request from a user, said entitlement package and a downloading software application;
    executing, by at least one of the one or more computer processors, said entitlement package and said downloading software application;
    retrieving via said target compute node, by at least one of the one or more computer processors, via said downloading software application, said encrypted version of said object store access information;
    decoding, by at least one of the one or more computer processors, said encrypted version of said object store access information resulting in said object store access information being decrypted; and
    authenticating, by at least one of the one or more computer processors, based on results of said decoding, object store access.

3. The method of claim 2, further comprising:
    retrieving, by at least one of the one or more computer processors, via said downloading software application, said compressed frozen image of said micro-cloud application;
    uncompressing, by at least one of the one or more computer processors, said compressed frozen image of said micro-cloud application resulting in said frozen image of said micro-cloud application; and
    executing, by at least one of the one or more computer processors, via target compute node, said micro-cloud application.

4. The method of claim 3, wherein said retrieving said compressed frozen image of said micro-cloud application comprises:
    generating a read only one time use URL;
    transmitting said read only one time use URL to a download command application;
    during downloading of said compressed frozen image, signaling initiation of said downloading; and
    deleting said read only one time use URL.

5. The method of claim 4, wherein said read only one time use URL comprises a specified time limit for use.

6. The method of claim 4, wherein said transmitting said read only one time use URL comprises:
    connecting said one time use URL to said download command application.

7. The method of claim 4, further comprising:
generating, by at least one of the one or more computer processors, a notification indicating said retrieving said compressed frozen image of said micro-cloud application.

8. The method of claim 1, further comprising:
providing at least one support service for at least one of creating, integrating, hosting, maintaining, and deploying computer-readable code in the computing system, said code being executed by the computer processor to implement: said registering, said transmitting, said compressing, said reading, said retrieving, said uploading, and said generating.

9. A computing system comprising one or more computer processors coupled to a computer-readable memory unit, said memory unit comprising instructions that when executed by at least one of the one or more computer processors implements an image uploading method comprising:
registering, by at least one of the one or more computer processors, based on a specified business agreement between an application vendor and an administrator of said computing system, said application vendor with an account with respect to said computing system;
transmitting, by at least one of the one or more computer processors, to said application vendor in response to said registering, a credentials file and an uploading software application;
executing, by at least one of the one or more computer processors, said uploading software application;
compressing, by at least one of the one or more computer processors, a frozen image of a micro-cloud application running on an origin compute node associated with an application owner resulting in a compressed micro-cloud application;
reading, by at least one of the one or more computer processors, said credentials file;
retrieving, by at least one of the one or more computer processors, based on results of said reading, object store access information comprising an object store path and an object store authentication key;
uploading by at least one of the one or more computer processors, said compressed frozen image of said micro-cloud application in response to said retrieving said object store access information; and
generating, by at least one of the one or more computer processors executing said uploading software application, an entitlement package comprising said compressed frozen image of said micro-cloud application and an encrypted version of said object store access information.

10. The computing system of claim 9, wherein said method further comprises:
retrieving from a target compute node, by at least one of the one or more computer processors, in response to a request from a user, said entitlement package and a downloading software application;
executing, by at least one of the one or more computer processors, said entitlement package and said downloading software application;
retrieving via said target compute node, by at least one of the one or more computer processors, via said downloading software application, said encrypted version of said object store access information;
decoding, by at least one of the one or more computer processors, said encrypted version of said object store access information resulting in said object store access information being decrypted; and
authenticating, by at least one of the one or more computer processors, based on results of said decoding, object store access.

11. The computing system of claim 10, wherein said method further comprises:
retrieving, by at least one of the one or more computer processors, via said downloading software application, said compressed frozen image of said micro-cloud application;
uncompressing, by at least one of the one or more computer processors, said compressed frozen image of said micro-cloud application resulting in said frozen image of said micro-cloud application; and
executing, by at least one of the one or more computer processors, via said target compute node, said micro-cloud application.

12. The computing system of claim 11, wherein said retrieving said compressed frozen image of said micro-cloud application comprises:
generating a read only one time use URL;
transmitting said read only one time use URL to a download command application;
during downloading of said compressed frozen image, signaling initiation of said downloading; and
deleting said read only one time use URL.

13. The computing system of claim 12, wherein said read only one time use URL comprises a specified time limit for use.

14. The computing system of claim 12, wherein said transmitting said read only one time use URL comprises:
connecting said one time use URL to said download command application.

15. The computing system of claim 12, wherein said method further comprises:
generating, by at least one of the one or more computer processors, a notification indicating said retrieving said compressed frozen image of said micro-cloud application.

16. A computer program product, comprising a computer readable hardware storage device storing a computer readable program code, said computer readable program code comprising an algorithm that when executed by one or more computer processors of a computing system implements an image uploading method, said method comprising:
registering, by at least one of the one or more computer processors, based on a specified business agreement between an application vendor and an administrator of said computing system, said application vendor with an account with respect to said computing system;
transmitting, by at least one of the one or more computer processors, to said application vendor in response to said registering, a credentials file and an uploading software application;
executing, by at least one of the one or more computer processors, said uploading software application;
compressing, by at least one of the one or more computer processors, a frozen image of a micro-cloud application running on an origin compute node associated with an application owner resulting in a compressed micro-cloud application;
reading, by at least one of the one or more computer processors, said credentials file;
retrieving, by at least one of the one or more computer processors, based on results of said reading, object store access information comprising an object store path and an object store authentication key;

uploading by at least one of the one or more computer processors, said compressed frozen image of said micro-cloud application in response to said retrieving said object store access information; and generating, by at least one of the one or more computer processors executing said uploading software application, an entitlement package comprising said compressed frozen image of said micro-cloud application and an encrypted version of said object store access information.

17. The computer program product of claim 16, wherein said method further comprises:

retrieving from a target compute node, by at least one of the one or more computer processors, in response to a request from a user, said entitlement package and a downloading software application;

executing, by at least one of the one or more computer processors, said entitlement package and said downloading software application;

retrieving via said target compute node, by at least one of the one or more computer processors, via said downloading software application, said encrypted version of said object store access information;

decoding, by at least one of the one or more computer processors, said encrypted version of said object store access information resulting in said object store access information being decrypted; and authenticating, by at least one of the one or more computer processors, based on results of said decoding, object store access.

18. The computer program product of claim 17, wherein said method further comprises:

retrieving, by at least one of the one or more computer processors, via said downloading software application, said compressed frozen image of said micro-cloud application;

uncompressing, by at least one of the one or more computer processors, said compressed frozen image of said micro-cloud application resulting in said frozen image of said micro-cloud application; and executing, by at least one of the one or more computer processors, via said target compute node, said micro-cloud application.

19. The computer program product of claim 18, wherein said retrieving said compressed frozen image of said micro-cloud application comprises:

generating a read only one time use URL;

transmitting said read only one time use URL to a download command application;

during downloading of said compressed frozen image, signaling initiation of said downloading; and deleting said read only one time use URL.

20. The computer program product of claim 19, wherein said read only one time use URL comprises a specified time limit for use.

* * * * *